(12) United States Patent
Nilsson

(10) Patent No.: US 6,187,274 B1
(45) Date of Patent: Feb. 13, 2001

(54) TURBULENCE INDUCER IN A CATALYTIC CONVERTER CHANNEL

(75) Inventor: Sven Melker Nilsson, Kallered (SE)

(73) Assignee: Sandvik AB, Sandviken (SE)

( * ) Notice: Under 35 U.S.C. 154(b), the term of this patent shall be extended for 0 days.

(21) Appl. No.: 09/094,597

(22) Filed: Jun. 15, 1998

Related U.S. Application Data

(63) Continuation of application No. PCT/SE95/01501, filed on Dec. 13, 1995, now abandoned.

(51) Int. Cl.$^7$ ................................................. B01J 35/04
(52) U.S. Cl. ..................... 422/180; 422/177; 422/222; 502/439; 502/527.21; 502/527.22
(58) Field of Search ................................ 422/177, 180, 422/222; 502/439, 527.21, 527.22

(56) References Cited

U.S. PATENT DOCUMENTS

| | | | |
|---|---|---|---|
| 4,152,302 | 5/1979 | Nonnenmann et al. | 502/338 |
| 5,384,100 | 1/1995 | Freund | 422/180 |

FOREIGN PATENT DOCUMENTS 0 298 943   1/1989   (EP) .

*Primary Examiner*—Hien Tran
(74) *Attorney, Agent, or Firm*—Burns, Doane, Swecker & Mathis, L.L.P.

(57) ABSTRACT

A catalytic converter includes a channel for conducting a gas flow forwardly in a longitudinal direction. The channel is coated with a catalyst and has at least first and second turbulence generators spaced apart in the longitudinal direction for making the gas flow turbulent. Each turbulence generator includes a rear face inclined forwardly at an angle of from 35 to 60° from a base of the channel and facing rearwardly, a connecting face extending forwardly from a free edge of the rear face and a front face projecting toward the base from a front edge of the connecting face and facing forwardly. The first turbulence generator is disposed closer to an inlet of the channel than the second turbulence generator. A longitudinal center of the first turbulence generator is spaced longitudinally from the channel inlet by a distance, which is a function of the hydraulic diameter of the channel, the Reynold's number, and the Schmidt's number 1 of the gas.

7 Claims, 4 Drawing Sheets

TURBULENCE INDUCER IN A CATALYTIC CONVERTER CHANNEL

RELATED INVENTION

This application is a Continuation Application of International Application No. PCT/SE95/01501 filed on Dec. 13, 1995, now abandoned.

BACKGROUND OF THE INVENTION

The invention relates to improvements in catalytic converters for optimizing the ratio between pressure drop and mass transfer of gases.

Usually, a catalytic converter has a substrate constructed from a considerable number of neighboring small channels through which flows a gas or a gas mixture to be converted by means of a catalyst coated on the substrate. Various materials may be used to construct catalytic converters, such as ceramic materials, or metal, e.g. stainless steel or aluminum.

The cross-section of the channels of ceramic catalytic converter substrates usually is rectangular or polygonal, i.e. hexagonal. This type of catalytic converter is manufactured by extrusion, a method that produces channels having the same cross-section along their entire length and channel walls that are smooth and even.

In the manufacture of catalytic converter substrates from metal, corrugated strips or foils are arranged alternatingly with flat strips or foils and such an assembly is wound about an axis. A resulting channel cross-sectional shape is triangular or trapezoidal. The metal catalytic converters that are available on the market are formed with channels having an equal cross-sectional size along their entire length and, like the ceramic catalytic converter substrates, their channel walls are smooth and even.

The most essential feature is the mass transfer that takes places between the gas (or the gas mixture flowing through the channels) and the catalytic converter channel walls. The coefficient of mass transfer, which is a measure of the mass transfer rate, must be high if high efficiency of catalytic conversion is to be achieved.

In catalytic converters of the kind mentioned above, which are used in internal combustion engines or in industry, the channels have a comparatively small cross-sectional shape, and the gas, at the gas velocities common in these contexts, flows in comparatively regular layers in the direction of the channels. Thus, the flow is mainly laminar. Only along a shorter length adjacent the channel inlets does some cross-wise flow take place in the direction towards the channel walls. To categorize the gas flow the so called Reynolds number is used, the value of which in these applications is between 100 and 600. As long as the Reynolds number remains lower than approximately 2000, the flow remains laminar.

It is well known within the technical field concerned, that in laminar gas flows a boundary layer is formed closest to the channel walls, in which boundary layer the gas velocity is substantially zero. This boundary layer strongly reduces the coefficient of mass transfer, above all in the case of so called fully developed flow. In order to increase the coefficient of mass transfer, the gas must be made to flow towards the channel surface, which reduces the boundary layer and increases the flow transfer from one layer to another. This may be effected by turbulent flows. In smooth and even channels the laminar flow turns turbulent when the Reynolds number reaches values above approximately 2000. If one wishes to reach a Reynolds number of this magnitude in the channels of the type of catalytic converters concerned herein, considerably higher gas velocities than are conventional in these contexts are required. In the catalytic converters of the kind referred to above having a low Reynolds number, it is therefore necessary to create turbulence by artificial means, for instance by arranging special turbulence generators inside the channels.

A large number of turbulence generators are already known. From European Publication No. 0298943 there is known a catalytic converter having channels with turbulence generators therein in the form of transverse corrugations. From Nonnenmann et al. U.S. Pat. No. 4,152,302, there is known a catalytic converter having channels in which turbulence generators in the form of transverse metal flaps punched from the structural material are provided. Also combinations of these two types of turbulence generators exist.

A feature common to turbulence generators of this kind is their ability to significantly increase the mass transfer. However, also the pressure drop increases dramatically. In fact, the pressure drop increase has proved to exceed the increase of mass transfer. The pressure drop as such depends on the configuration, dimensions and geometry of the turbulence generators. However, it is well known that said types of turbulence generators produce a pressure drop that is too high, which has prevented them from being used commercially to any significant extent.

SUMMARY OF THE INVENTION

The invention is based on the realization that the turbulence generators should be so placed and so configured in the catalytic converter channels that an optimal ratio of pressure drop to mass transfer is obtained. In the application concerned here, reference is made to the concept of hydraulic diameter, which is an expression denoting the ratio of the through-flow channel cross-section area to the channel perimeter. At the inlets of the catalytic converter channels the coefficient of mass transfer is high because the boundary layer is very thin. The thickness of the boundary layer gradually increases in the direction of the main flow and the coefficient of mass transfer, i.e., the rate of the transfer of mass towards the channel surface is reduced.

In order to increase the mass transfer, and consequently the efficiency of the catalytic conversion, turbulence generators in the channel walls should not be positioned too close to the inlets, since the mass transfer is already high in this area. Overall, the provision of turbulence generators in this area therefore would only cause an increase of the pressure drop, which is not desirable.

The invention involves a catalytic converter which includes a channel for conducting a gas flow forwardly in a longitudinal direction. The channel is coated with a catalyst and has at least first and second turbulence generators spaced apart in the longitudinal direction for making the gas flow turbulent. Each turbulence generator includes a rear face inclined forwardly at an angle of from 35 to 60° from a base of the channel and facing rearwardly, a connecting face extending forwardly from a free edge of the rear face at a height e from the channel base and having a length B in the longitudinal direction, and a front face projecting toward the base from a front edge of the connecting face and facing forwardly. The first turbulence generator is disposed closer to an inlet of the channel than the second turbulence generator. A longitudinal center of the first turbulence generator is spaced longitudinally from the channel inlet by a distance X1, wherein:

$$0.01 < \frac{X_1}{D_h \cdot R_e \cdot S_c} < 0.015$$

wherein:
$D_h$ is the hydraulic diameter of the channel
$R_e$ is the Reynold's number and
$S_c$ is the Schmidt's number 1 of the gas;
and further wherein:
a ratio of the height e to the hydraulic diameter $D_h$ is between 0.35 and 1.0;
a ratio of a distance P between longitudinal centers of the first and second turbulence generators to said height e is between 20 and 50; and,
a ratio of the length B of the connecting face to the height e is between 1.5 and 4.0.

BRIEF DESCRIPTION OF THE DRAWING

The invention will be explained in more detail in the following with reference to the accompanying drawing, wherein.

DETAILED DESCRIPTION OF PREFERRED EMBODIMENTS OF THE INVENTION

Figure 1:
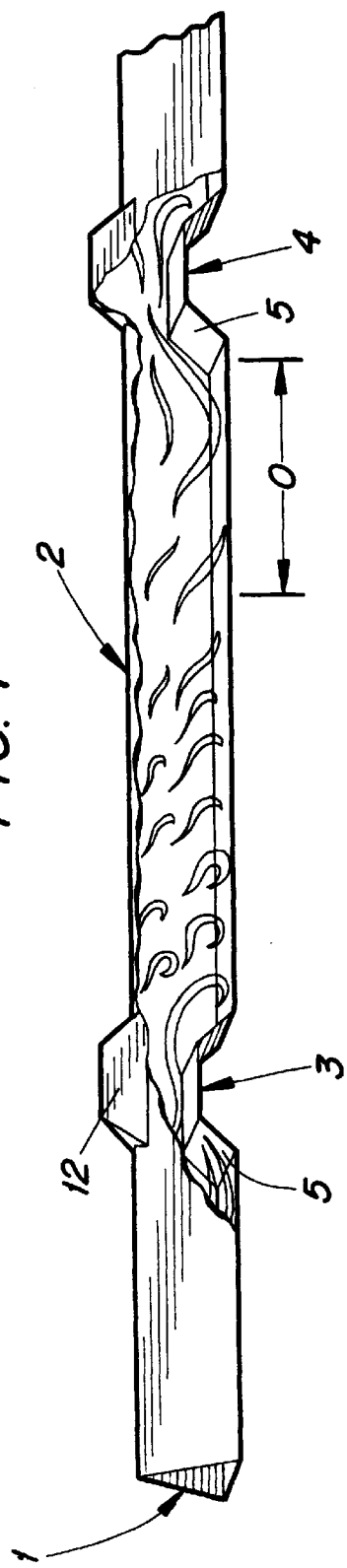
FIG. 1 is a schematic perspective view, partially broken away, showing a channel of a catalytic converter, partially broken away, to reveal turbulence generators in accordance with the invention.

In FIG. 1 there is schematically shown an inlet 1 of a channel 2 and a part of the rest of the channel 2 in a catalytic converter which comprises a multitude of such channels, as will be explained. The channel conducts a gas flow longitudinally forwardly therein (i.e., toward the right in FIG. 1). The drawing shows a first turbulence generator 3 positioned closest to the inlet 1 and a second turbulence generator 4 spaced longitudinally therefrom. Additional turbulence generators could be provided. The channel 2 has a height h. The turbulence generators project from a base 8 of the channel. The distance $X_1$ from the inlet opening to the longitudinal center of the first turbulence generator 3 is defined by the following expression:

$$0.01 < \frac{X_1}{D_h \cdot R_e \cdot S_c} < 0.015$$

wherein
$D_h$ is the hydraulic diameter of the channel, which is equal to four times the cross-sectional area of the channel divided by the recited perimeter;

$R_e$ is the Reynolds number (ulρ/μ), where u is gas velocity, l is a characteristic dimension of the channel (i.e., the hydraulic diameter $D_h$); ρ is the mass density of the gas; and μ is the gas viscosity; and $S_c$ is the Schmidt's number of the gas, more specifically, Schmidt number 1 (also known as the Prandtl number) which is equal to the kinematic viscosity of the gas divided by the molecular diffusivity (also known as the diffusion coefficient). The kinematic viscosity equals the dynamic viscosity divided by the density.

It is apparent from the above expression that $X_1$ depends on the Reynolds number and thus on the gas velocity. The optimal position of the first turbulence generator 3 thus depends on the prevailing operating conditions.

Figure 2:
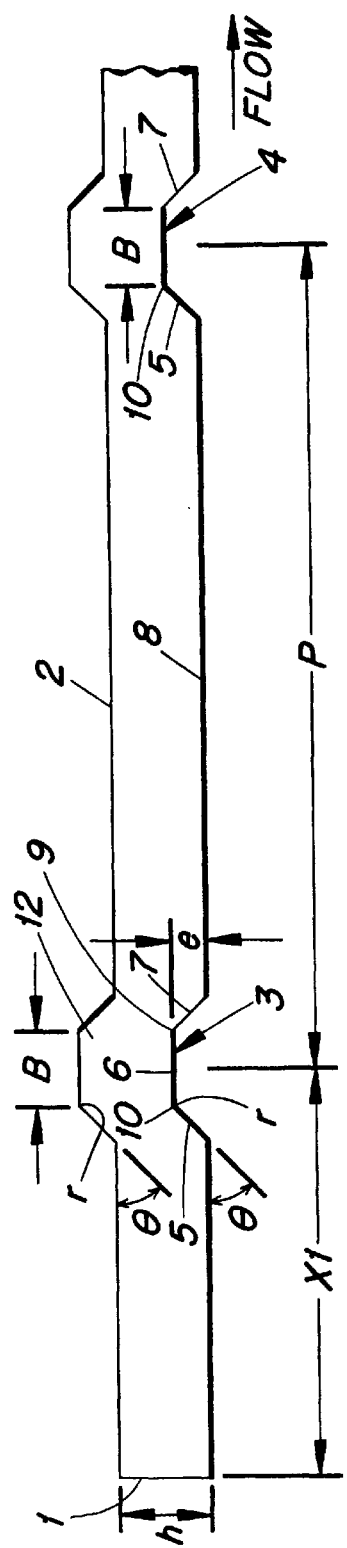
FIG. 2 is a schematic longitudinal sectional view of the channel depicted in FIG. 1.
Figure 3:
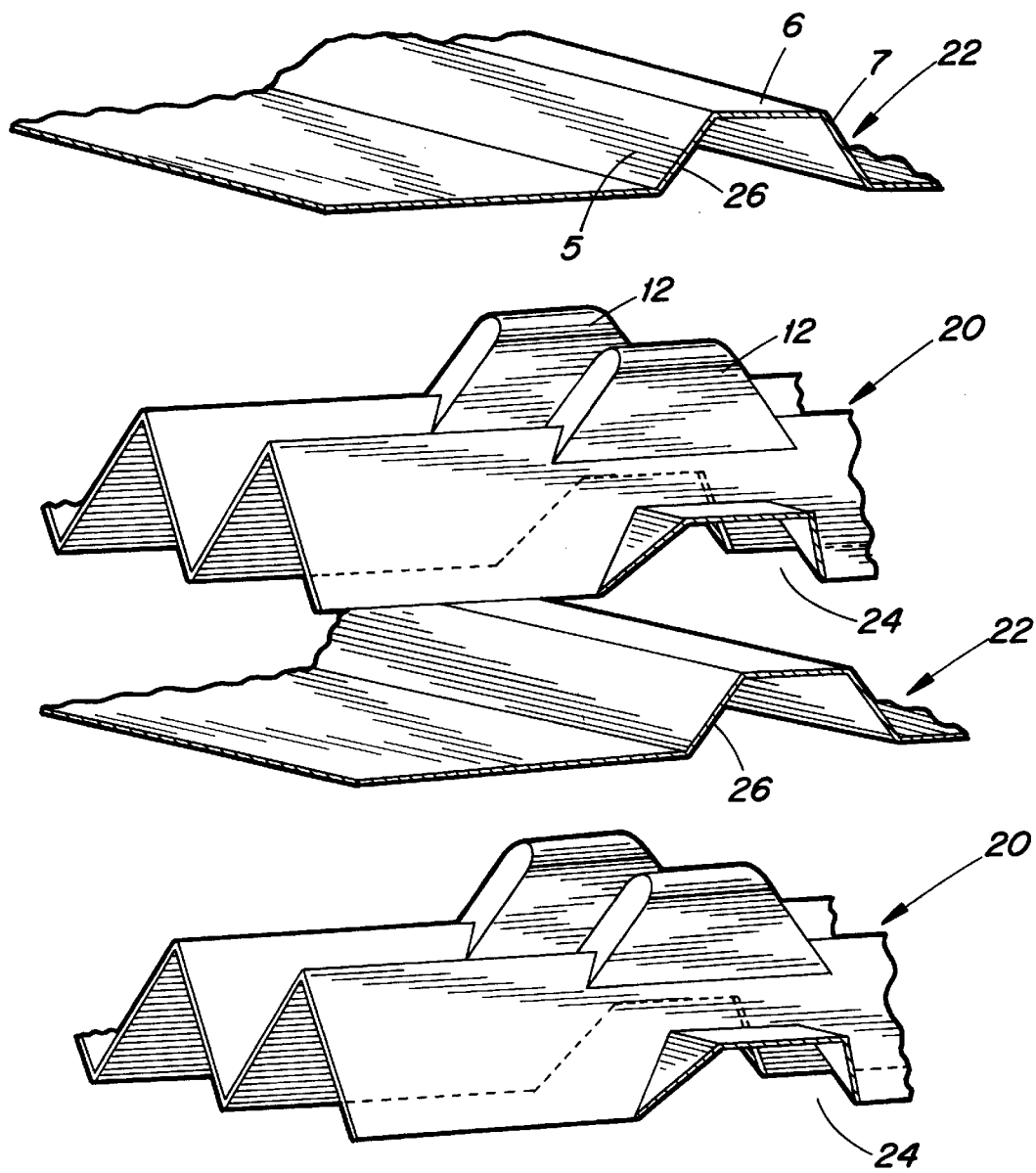
FIG. 3 is an exploded perspective view of foils utilized in forming a catalytic converter which utilizes the principles explained in connection with FIG. 1.
Figure 4:
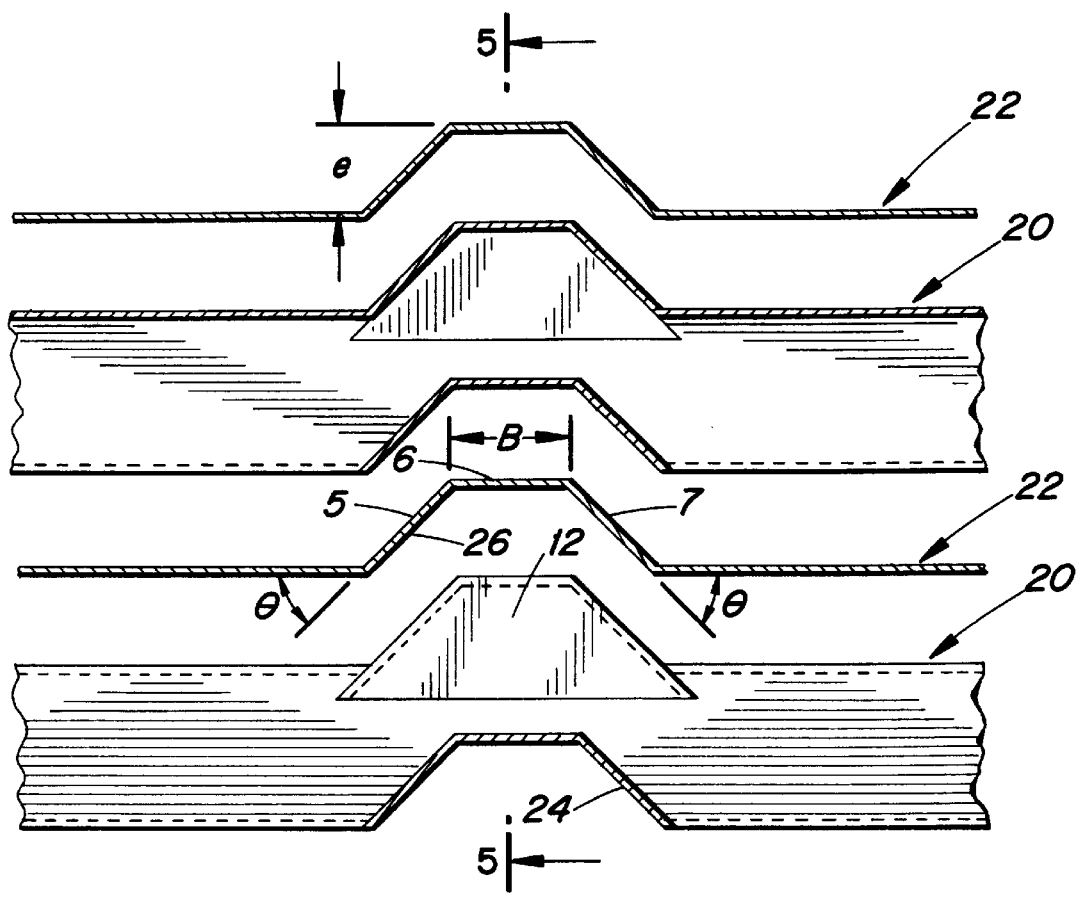
FIG. 4 is a longitudinal sectional view taken through the exploded foils of FIG. 3.

As appears particularly from FIG. 2, each of the turbulence generators 3,4 is given a specific geometrical configuration. Thus, each generator is formed with an obliquely sloping rearwardly facing first or rear edge face 5 facing opposite the gas flow direction, a flat connecting face 6, and an obliquely sloping second edge face 7 facing forwardly, i.e., in the same direction as the gas flow. The connecting face 6 interconnects free edges 9, 10 of the sloping faces 7, 5.

In accordance with the invention the following conditions apply:

The angle θ defining the inclination of the first edge face 5 relative to the base 8 of the catalytic converter channel 2 should be between 35 and 60 degrees (more preferably between 35 and 50 degrees), and the ratio of: (i) the height e of the upper face 6 from the base 8 to (ii) the hydraulic diameter $D_h$ of the channel 2, should be between 0.35 and 1.0. In addition, the ratio of: (i) the distance P between the longitudinal centers of the first and the second turbulence generators 3 and 4 to (ii) said height dimension e, should be between 20 and 50. The ratio of: (i) the longitudinal length B of the face 6 of each turbulence generator 3, 4 to (ii) the height e, should be between 1.5 and 4.0.

The region of the channel located opposite each of the turbulence generators is preferably enlarged at 12 to minimize a pressure drop increase caused by the presence of the turbulence generator. However, the gas flow in the enlarged region 12 will not participate in the main gas stream; rather, it will move slowly in eddies and thus will have only a minor influence on turbulence. Normally, the dimension e will be about 50–60% of the channel height h, and the active cross-sectional area for gas flow within the region containing the turbulence generator will be about one fourth of the active cross-sectional area for gas flow upstream of the turbulence generator. Thus, the velocity of gas traveling past the turbulence generator would be about four times the velocity occurring upstream thereof.

The preferred cross-sectional shapes for the channels according to the present invention are the triangular and trapezoidal.

By configuring the turbulence generators 3, 4 with a specific geometrical configuration in accordance with the teachings of the invention and positioning them at a predetermined distance from one another and from the inlet 1 in a channel 2 having a preferably triangular or trapezoidal cross-sectional shape, an increased mass transfer is achieved, and consequently also increased catalytic conversion, but accompanied by only a moderate pressure-drop increase. When the gas flow approaches the turbulence generator 3, the flow velocity increases locally due to the reduced cross-sectional area. When the gas thereafter passes the turbulence generator 3 and leaves the edge 9 formed at the junction between the face 6 and the second edge face 7, a violent turbulent motion arises on account of such separation and the highly expanding cross-sectional area now encountered by the gas. This process very efficiently increases the mass transfer.

The second turbulence generator 4 is located at a calculated distance P from the first turbulence generator 3 to allow the turbulence thus created to be made use of as completely as possible and in order for a recontacting zone, indicated by 0 in FIG. 1, to form before the gas reaches the second turbulence generator 4. In this manner, an unnecessary excess pressure drop is prevented without a significant increase of the mass transfer in the already turbulent gas flow. In the re-contacting zone 0 the gas will again to a large extent flow adjacent the smooth surface before reaching the second turbulence generator 4.

It is important that the edges 9, 10 of the turbulence generators 3, 4 be sufficiently sharp to create the separation points (shifting points). The radius r of the edges, see FIG. 2, should be such that the ratio of r to $D_h$ is between 0.04 and 0.2.

By configuring the turbulent generators in accordance with the teachings of the invention they become efficient also at the high gas velocities at which a turbulent flow would form also in a smooth channel. The turbulence that forms naturally is reinforced by the converging/diverging effect and by the mechanisms of separation and re-contacting of the gas.

The mass transfer increase in accordance with the invention may be utilized in the following manner. The mass transfer j usually is determined by the expression $j = p \cdot h_M \cdot A (w_{1s} - w_{1w})$
wherein $h_M$ is the coefficient of mass transfer A is the area of the transferring surface $W_{1s}$ is the mass fraction of substance 1 in the gas (bulk value)

$W_{1w}$ is the mass fraction of substance 1 at the surface p is the density of the gas.

The expression $w_{1s} - w_{1w}$ is a measure of the concentration of unconverted gas. If $h_M$ increases, the catalytic conversion increases for a constant size of surface A. On the other hand if it is not necessary to increase j, and the mass transfer instead is maintained constant, the area of the channel surface may be reduced. It then becomes possible also to reduce the amount of carrier material (stainless steel or aluminum in the case of metal catalytic converters and washcoat) and the very expensive noble metals in the catalytic converter, and in this manner considerable economical gains may be made.

If instead, for a given front area of the catalytic converter, it is desirable to reduce the area of the channel surface, such area reduction may be done by increasing the hydraulic diameter. This reduces the pressure drop, which may be used for the extra pressure drop resulting from the generation of the turbulence. In this manner, the pressure drop increase may be limited, despite the increase of the mass transfer ($h_M$ increases). Consequently, the higher coefficient of mass transfer compensates for the reduced channel surface area. The amount of carrier material and washcoat, and the expensive noble metals in the catalytic converter may thus again be lessened and consequently considerable economical gains be made.

With respect to the so-called fully developed flow region in a straight channel of predetermined dimensions, the pressure drop (for a given gas velocity) is inversely proportional to the hydraulic diameter. When the hydraulic diameter is increased, for instance by a factor of 2, the pressure drop falls correspondingly. In the case of fully developed flow and mass fraction fields also the mass transferring surface is however, inversely proportional to the hydraulic diameter. Thus, also the transfer is reduced. If a comparatively large channel is provided with turbulence generators in accordance with the invention the pressure drop and the mass transfer will increase. Without reducing the mass transfer the pressure drop will be increased to the values applicable to a smaller-size channel. The exact numerical value of the mass transfer depends on the geometry of turbulence generators. When the coefficient of mass transfer reaches values twice those applicable to the smaller-size channel, the same catalytic conversion may be achieved while using almost only half the amount of the material (carrier material, washcoat and noble metals).

One tested embodiment of the invention for a triangular channel having a height 2.6 mm, and a channel base length b of 3.7 mm, possessed the following parameters: X1=15 mm; θ=45°; e=1.4 mm; Dh=1.86 mm; P=25 mm and B=2 mm.

A technique for forming channels according to the invention is depicted in FIGS. 3–6. A series of corrugated and flat foils 20, 22 (e.g., stainless steel or aluminum) are stacked in alternating fashion. Each corrugated foil includes trapezoidal notches 24 (only one notch shown in FIG. 3) extending completely therethrough in a direction perpendicular to the direction of the corrugations, and enlargements or enlarged regions 12 disposed opposite each notch. The flat foils 22 are not exactly flat because they include trapezoidal ridges 26 that are to form the turbulence generators. Thus, each ridge 26 includes the afore-described faces 5, 6, 7. The ridge 26 is inserted into a respective notch 24 (see FIG. 6), whereby the flat foil 22 forms the base 8 of each triangular channel 2, and the projections or ridges 26 of each flat foil form the turbulence generators 3, 4. It will also be appreciated that between adjacent triangular channels 2 there is provided another channel 30 for which the flat foils 22 also form turbulence generators 32.

Figure 7:
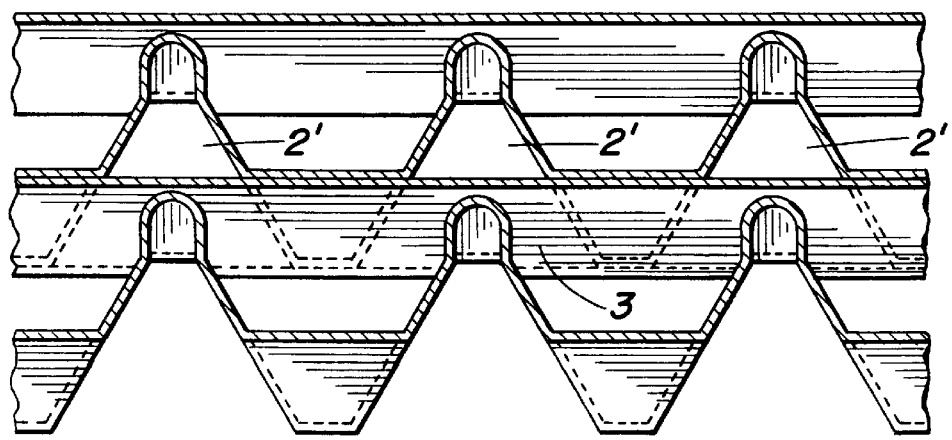
FIG. 7 is a view similar to FIG. 6 of an alternative embodiment of the invention.
Figure 5:
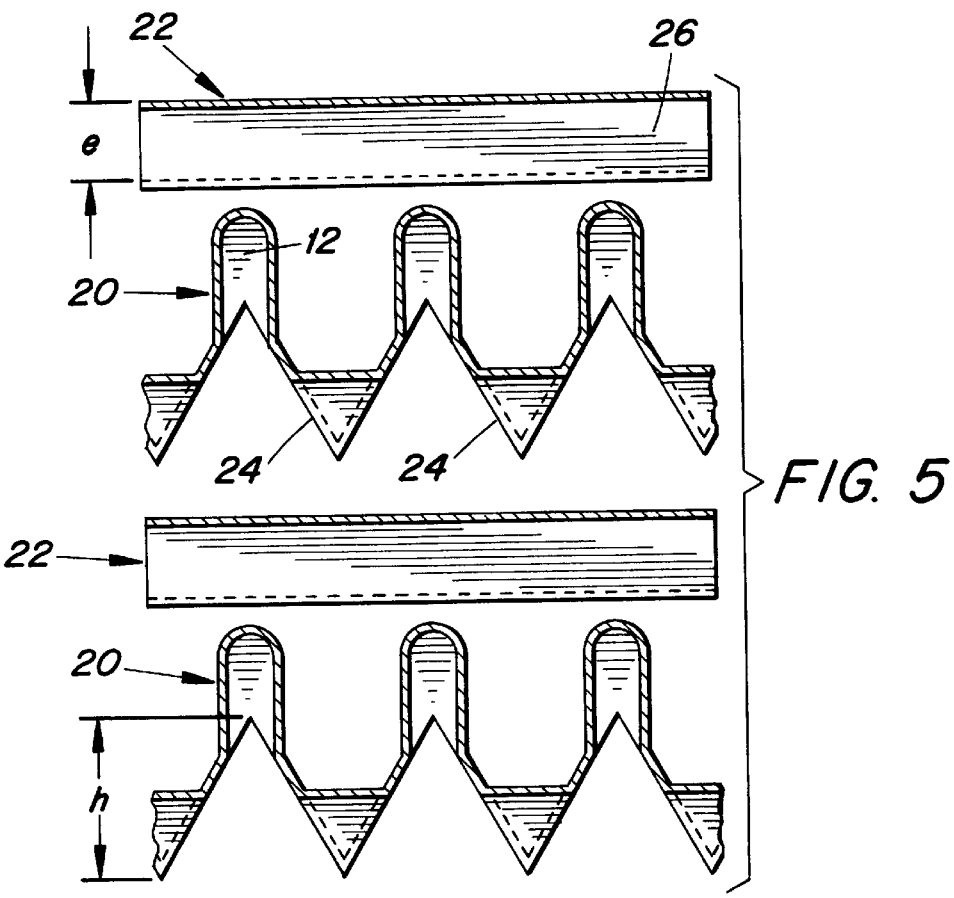
FIG. 5 is a cross-sectional view taken along the line 5—5 in FIG. 4.
Figure 6:
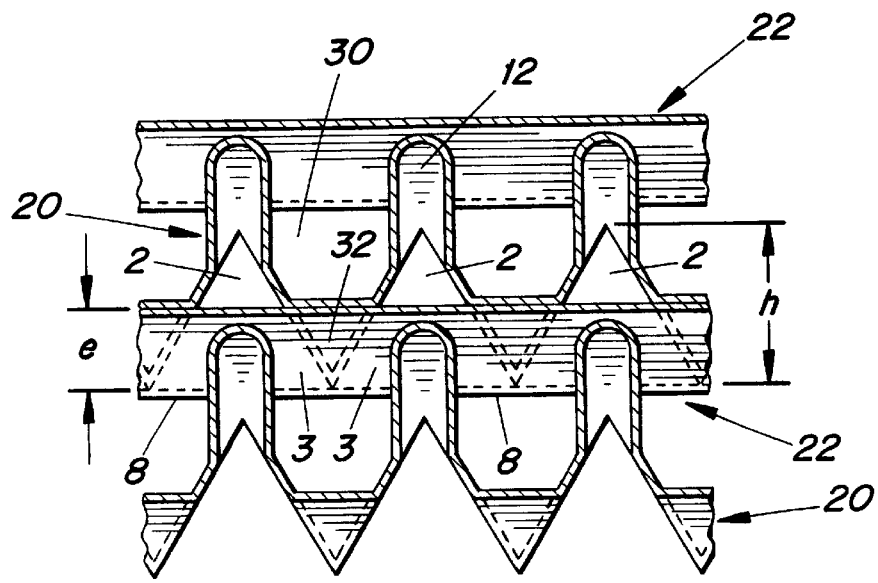
FIG. 6 is a cross-sectional view similar to FIG. 5, with the foils assembled together.

FIG. 7 shows an arrangement similar to FIG. 6, but wherein the channels 2' are trapezoidal rather than triangular.

After a stack of corrugated and flat foils has been formed, it is wound about an axis extending parallel to the corrugations, in the conventional manner. The foils are coated with a catalyst either before or after being stacked and wound.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A catalytic converter comprising a channel for conducting a gas flow forwardly in a longitudinal direction; the channel coated with a catalyst and having at least first and second turbulence generators spaced apart in the longitudinal direction for making the gas flow turbulent; each turbulence generator including a rear face inclined forwardly at an angle of from 35 to 60° from a base of the channel and facing rearwardly, a connecting face extending forwardly from a free edge of the rear face at a height e from the channel base and having a length B in the longitudinal direction, and a front face projecting toward the base from a front edge of the connecting face and facing forwardly; the first turbulence generator disposed closer to an inlet of the channel than the second turbulence generator; a longitudinal center of the first turbulence generator being spaced longitudinally from the channel inlet by a distance X1, wherein:

$$0.01 < \frac{X_1}{D_h \cdot R_e \cdot S_c} < 0.015$$

wherein:
- $D_h$ is the hydraulic diameter of the channel
- $R_e$ is the Reynold's number and
- $S_c$ is the Schmidt's number 1 of the gas;

and further wherein:
- a ratio of the height e to the hydraulic diameter $D_h$ is between 0.35 and 1.0;
- a ratio of a distance P between longitudinal centers of the first and second turbulence generators to said height e is between 20 and 50; and,
- a ratio of the length B of the connecting face to the height e is between 1.5 and 4.0.

2. The catalytic converter according to claim 1 wherein the channel is of triangular cross-sectional shape.

3. The catalytic converter according to claim 1 wherein the channel is of trapezoidal cross-sectional shape.

4. The catalytic converter according to claim 1 wherein the channel includes an enlargement disposed opposite each turbulence generator.

5. The catalytic converter according to claim 1 wherein the rear face is inclined forwardly toward the base.

6. The catalytic converter according to claim 5 wherein the rear face forms an angle of between 35 to 60 degrees with the base.

7. The catalytic converter according to claim 6 wherein the angle is between 35 and 50 degrees.

* * * * *